Patented May 16, 1950

2,507,625

UNITED STATES PATENT OFFICE 2,507,625

CATALYST FOR CONVERSION OF HYDROCARBONS

Charles H. Ehrhardt, Western Springs, Ill., assignor to Universal Oil Products Company, Chicago, Ill., a corporation of Delaware No Drawing. Application August 3, 1946, Serial No. 688,340

2 Claims. (Cl. 252—437)

This invention relates to the conversion of hydrocarbons in the presence of a novel catalyst and to the preparation of the novel catalyst.

Various catalysts have heretofore been proposed for the conversion of hydrocarbons and among the more satisfactory catalysts are those containing silica and magnesia. However, it has been found that silica-magnesia catalysts are not thermally stable; that is, they tend to lose their activity when subjected to high temperatures which are encountered during the conversion reaction and particularly during the regeneration of the catalyst to burn carbonaceous deposits therefrom.

An object of the present invention is to improve the thermal stability of silica-magnesia catalysts. Another object is to increase the yields of gasoline obtainable by cracking a higher boiling oil in the presence of silica-magnesia catalysts. Still other objects and advantages of the present invention will be apparent from the following description.

In a broad aspect the present invention relates to a process for the conversion of a hydrocarbon which comprises subjecting said hydrocarbon to contact at conversion conditions with a catalyst prepared by treating a composite of silica and magnesia with ammonium phosphate and calcining to liberate ammonia.

In another embodiment the present invention relates to a hydrocarbon conversion catalyst prepared by treating a composite of silica and magnesia with ammonium phosphate and calcining to liberate ammonia.

The silica-magnesia composite may be prepared in any suitable manner. A particularly satisfactory method comprises commingling a mineral acid, such as sulfuric acid, with commercial waterglass under conditions to form silica gel. In this preparation the pH of the mixture of acid and waterglass is generally maintained at a range of about 6 to about 7 when effected at substantially atmospheric temperature. The silica gel, with or without washing but, generally with drying in the manner to be hereinafter set forth, may be ground to a powder or larger size granules, or the silica gel may be formed into particles of uniform size and shape by pelleting, extrusion or other methods.

When the catalyst is to be in spherical shape, a particularly preferred method is to distribute the mixture of waterglass and acid, formed in the manner hereinbefore set forth, by means of a nozzle or rotating disc into and through a bath of suitable suspending medium, such as mineral seal oil, the operation being controlled so that the silica sol sets to a firm hydrogel during passage through the oil. The spherical hydrogel may then be removed from the forming zone by means of a stream of water positioned beneath the oil bath. The size of the spheres may be regulated by controlling the size of the nozzle or the speed of the rotating disc. Microspheres having diameters of from about 50 to about 125 microns are particularly suitable for use in the hydrocarbon conversion reaction, although larger size spheres of from about $\frac{1}{32}''$ to about $\frac{1}{4}''$ in diameter or more, and particularly about $\frac{1}{8}''$, may be employed.

Silica gel formed in the above manner will contain sodium ions which should be removed. It generally is preferred to remove the sodium ions from the silica gel prior to compositing the silica with magnesia, although in some cases the removal of sodium ions may be delayed to a later stage in the preparation of the catalyst. The sodium ions may be removed in any suitable manner, a particularly preferred method being to wash the silica gel with acidulated water. In some cases it may be desirable to dry the silica gel prior to removal of the sodium ions.

Silica gel, either with or without prior washing or drying, may be composited with magnesia in any suitable manner. A particularly preferred method is to suspend the silica gel in a suitable magnesium salt solution, such as aqueous solutions of magnesium sulfate, magnesium chloride, magnesium nitrate, etc., and precipitate magnesium oxide by the addition of a suitable precipitating agent, such as ammonium hydroxide, or, in the case of decomposable magnesium salts, the oxide of magnesium may be developed by suitable heating of the composite. In another method, the silica particles may be composited with a slurry of magnesium oxide, followed by suitable drying, and, in still another method, washed and partially dried silica granules may be mechanically mixed in a ball mill, for example, with granules of magnesia.

Another method of preparing silica-magnesia composites comprises the co-precipitation thereof by adding a salt of magnesium in amounts to co-precipitate silica and magnesia. In this method of preparation the acid radical of the magnesium salt reacts with the basic constituents of waterglass to give the desired precipitates.

In general the magnesia will comprise a minor proportion and the silica will comprise a major proportion of the composite. The amounts of magnesia is preferably within the range of about 20 to about 30% by weight, although higher or lower proportions thereof may be employed when desired.

In accordance with the invention, silica-magnesia composites, formed in the manner hereinbefore set forth or in any suitable manner, are treated with an ammonium phosphate solution. A particularly preferred method is to suspend the silica-magnesia composite in an aqueous solution of ammonium phosphate or alternatively with solutions of ammonium acid phosphate under conditions to absorb the desired amount thereof. Since ammonium phosphate solutions and ammonium acid phosphate solutions may be used alternatively, it is understood that reference in the present specification and claims to ammonium phosphate is intended to also include ammonium acid phosphate. Excess ammonium phosphate solution may be removed and the silica-magnesia-ammonium phosphate composite may then be dried at a temperature of about 200° to about 500° F. for a period of 2 to 24 hours and finally calcined at a temperature of about 800° to about 1200° F. for a period of 2 to 12 hours. Ammonia is liberated during the heating treatment, to leave a phosphorus-containing residue. The quantity and strength of ammonium phosphate solution to be used will generally be regulated to leave, after the heating treatment, a phosphorus-containing residue amounting from about 0.5 to about 5% by weight of the final composite.

It has been found that silica-magnesia catalysts treated in the manner hereinbefore set forth, not only are of improved thermal stability, so that they will not be as readily detrimentally affected by high temperatures, but also increase the yields of gasoline obtained by the cracking of gas oil. This is illustrated in the following example.

A Mid-Continent gas oil about 31° A. P. I. gravity was subjected to cracking at a temperature of about 930° F. at a weight hourly space velocity (defined as the weight of oil per hour per weight of catalyst in the reaction zone) of 4 in the presence of the following catalysts.

Catalyst A, comprising silica-magnesia microspheres containing about 25% magnesia on a dry basis, was prepared by adding sulfuric acid to commercial waterglass, dropping the resultant sol from a rotating disc into a bath of mineral seal oil, the speed of the disc being regulated to form microspheres of about 90 microns in diameter, and the pH and time of passage during the oil bath being regulated so that a firm hydrogel was formed. The silica microspheres were washed to remove sodium ions, and subsequently were suspended in a magnesium sulfate solution, after which the spheres were dried for 16 hours at 230° F. and calcined for 6 hours at 1400° F.

In preparing catalyst B, a portion of catalyst A microspheres were suspended in a solution containing 35 grams of ammonium phosphate per 500 mm. of solution. The excess solution was drained off and the catalyst spheres were dried at 230° F. for a period of 16 hours and then calcined at 1400° F. for 6 hours. The finished catalyst contained about 1% by weight of a phosphorus-containing residue.

The results of these cracking runs are indicated in the following table.

Table

| Catalyst | Apparent Bulk Density | Weight Per Cent of Gas | Weight Per Cent of Gasoline | Weight Per Cent Conversion | Activity | |
|---|---|---|---|---|---|---|
| | | | | | Volume Per Cent | Weight Per Cent |
| A | 1.132 | 2.3 | 11.9 | 13.9 | 35 | 16 |
| B | 0.98 | 2.6 | 13.7 | 16.3 | 42 | 21 |

It will be noted that catalyst B, prepared in accordance with the present invention, effected a greater conversion at the same conditions of operation than catalyst A and also that catalyst B produced a higher percent of gasoline. When computed on either a volume or weight basis, catalyst B is of higher activity than catalyst A.

In the example hereinbefore set forth gas oil was subjected to catalytic cracking at a temperature of about 930° F. While gas oil is normally utilized as charging stock to catalytic cracking operations, it is understood that other higher boiling oils such as kerosene, fuel oil, reduced crude, topped crude, etc., may be utilized as the charging stock and that these oils may be subjected to catalytic cracking at temperatures within the range of about 850° to about 1050° F. at weight hourly space velocities ranging from about 0.5 to about 10. The catalyst may be used in the form of granules of irregular size and shape or of particles of uniform size and shape. The cracking reaction may be effected in fixed bed types of operation, fluidized types of operation in which the catalyst and hydrocarbons are maintained in a state of turbulence under hindered settling conditions, compact moving bed type processes in which the catalyst and hydrocarbons are passed either con-currently or counter-currently, slurry type operations in which the catalyst is carried as a slurry in the hydrocarbons, etc. The catalyst is periodically subjected to regeneration in either the same or different zone by burning carbonaceous deposits from the catalyst by means of air or other oxygen-containing gas.

Silica-magnesia type catalysts may also be used for other hydrocarbon conversion reactions as, for example, retreating operations in which an olefinic gasoline, such as thermally cracked gasoline, is subjected to treatment at a temperature of 600° to 1000° F. at low space velocities in order to produce a less olefinic product, isomerization of olefinic hydrocarbons, polymerization of olefinic hydrocarbons, alkyl transfer reactions, etc., and these reactions are comprised within the scope of the present invention.

I claim as my invention:

1. A catalyst prepared by calcining a silica gel-magnesia composite impregnated with an ammonium phosphate solution, said catalyst containing from about 20% to about 30% by weight of magnesia and from about 0.5% to about 5% by weight of the residual phosphorus compound of said phosphate, the remainder of the catalyst being silica gel.

2. A a catalyst prepared by calcining a silica gel-magnesia composite impregnated with an ammonium phosphate solution, the silica gel being in major proportion and the magnesia in minor proportion, and the catalyst containing from about 0.5% to about 5% by weight of the residual phosphorus compound of said phosphate.

CHARLES H. EHRHARDT.

REFERENCES CITED

The following references are of record in the file of this patent:

UNITED STATES PATENTS

| Number | Name | Date |
|---|---|---|
| 2,270,044 | Fulton et al. | Jan. 13, 1942 |
| 2,326,706 | Thomas et al. | Aug. 10, 1943 |
| 2,350,282 | La Lande, Jr. | May 30, 1944 |
| 2,355,388 | Michael et al. | Aug. 8, 1944 |
| 2,384,505 | Thomas et al. | Sept. 11, 1945 |